United States Patent [19]

Peyret

[11] Patent Number: 5,688,056
[45] Date of Patent: Nov. 18, 1997

[54] METHOD FOR CONTROLLING A PRINTER IN ORDER TO OBTAIN POSTAGES

[75] Inventor: Patrice Peyret, Fuveau, France

[73] Assignee: Gemplus Card International, Gemenos, France

[21] Appl. No.: 564,257

[22] PCT Filed: Jun. 14, 1994

[86] PCT No.: PCT/FR94/00704

§ 371 Date: Dec. 8, 1995

§ 102(e) Date: Dec. 8, 1995

[87] PCT Pub. No.: WO95/00929

PCT Pub. Date: Jan. 5, 1995

[30] Foreign Application Priority Data

Jun. 17, 1993 [FR] France ................... 93 07327

[51] Int. Cl.⁶ .................................................. B41J 5/30
[52] U.S. Cl. ..................... 400/61; 400/103; 235/382
[58] Field of Search ................... 400/61, 103, 120.01, 400/70, 74, 78; 235/375, 382

[56] References Cited

U.S. PATENT DOCUMENTS 4,629,871 12/1986 Scribner et al. ................. 235/382
4,980,542 12/1990 Jackson et al. .................. 235/375
5,480,239 1/1996 Kim et al. ..................... 400/124.02
5,567,061 10/1996 Nagata ............................ 400/61

FOREIGN PATENT DOCUMENTS

| A-0181949 | 5/1986 | European Pat. Off. . |
| A-0322727 | 7/1989 | European Pat. Off. . |
| A-0331352 | 9/1989 | European Pat. Off. . |
| A-2580844 | 10/1986 | France . |
| A-2603407 | 3/1988 | France . |
| A-2657985 | 8/1991 | France . |
| A-2193468 | 2/1988 | United Kingdom . |

*Primary Examiner*—John S. Hilten
*Attorney, Agent, or Firm*—Nilles & Nilles, S.C.

[57] ABSTRACT

Methods enabling the use of an office printer connected to a microcomputer in order to print legitimate postal marks. It uses a cartridge of special fonts in which there are stored the franking marks according to the standards laid down for the printer. A known security component is provided, on the one hand to protect access to the memory contained in the cartridge and, on the other hand, to perform the computation, for each printing of a franking mark, of a security mark that contains encrypted information elements that are readable by the postal authority, enabling the franking mark to be authenticated. It provides for the elimination of specific franking machines and limits the handling operations to the handling of a small-sized cartridge.

19 Claims, 2 Drawing Sheets

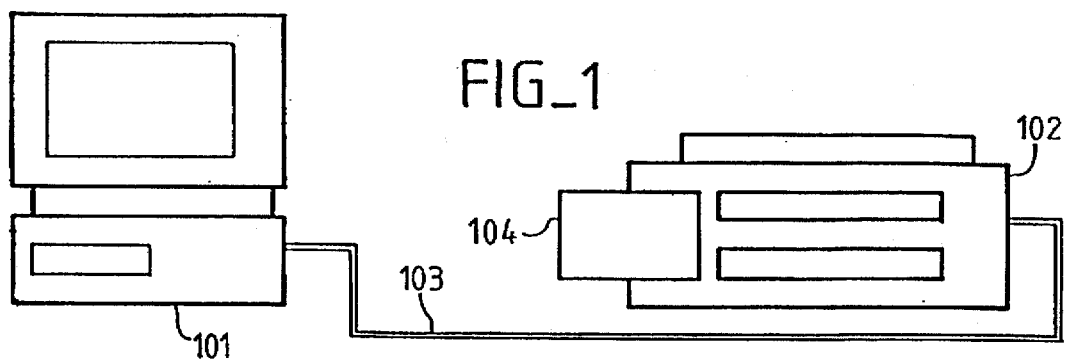
FIG_1
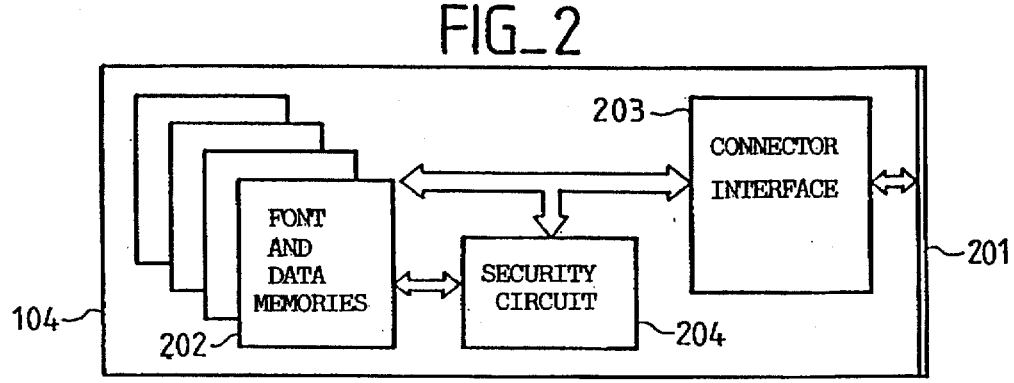
FIG_2
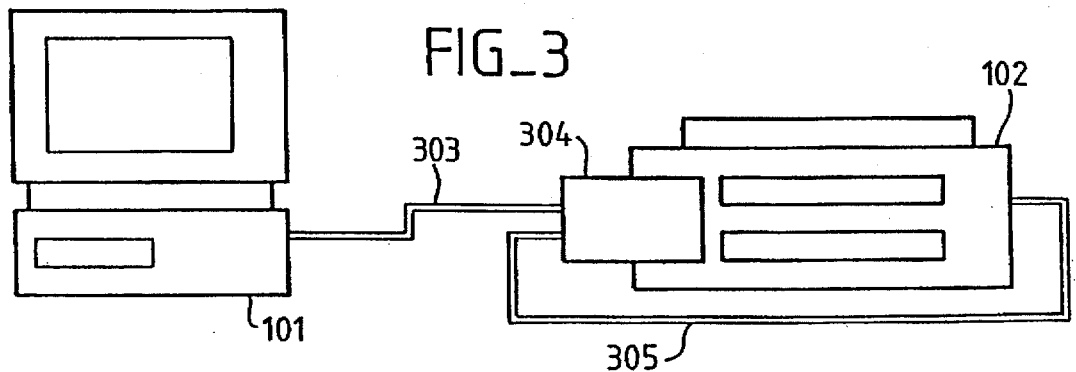
FIG_3
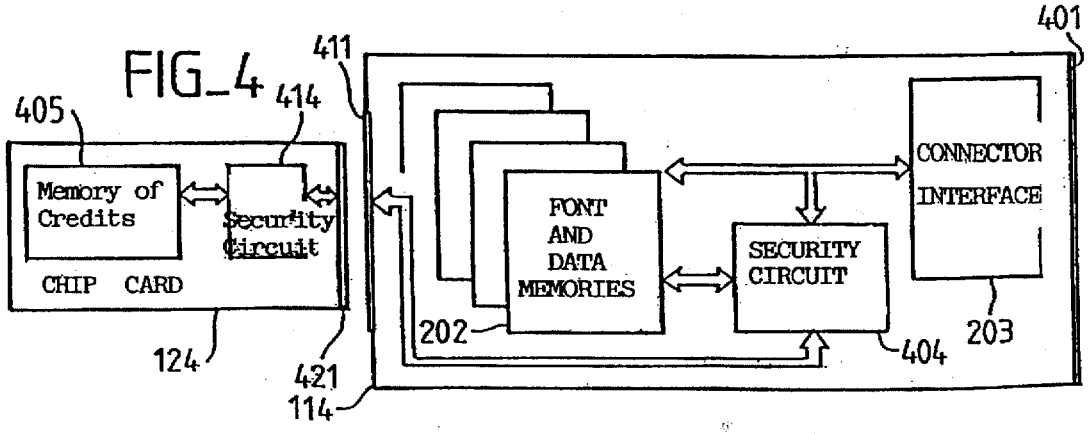
FIG_4

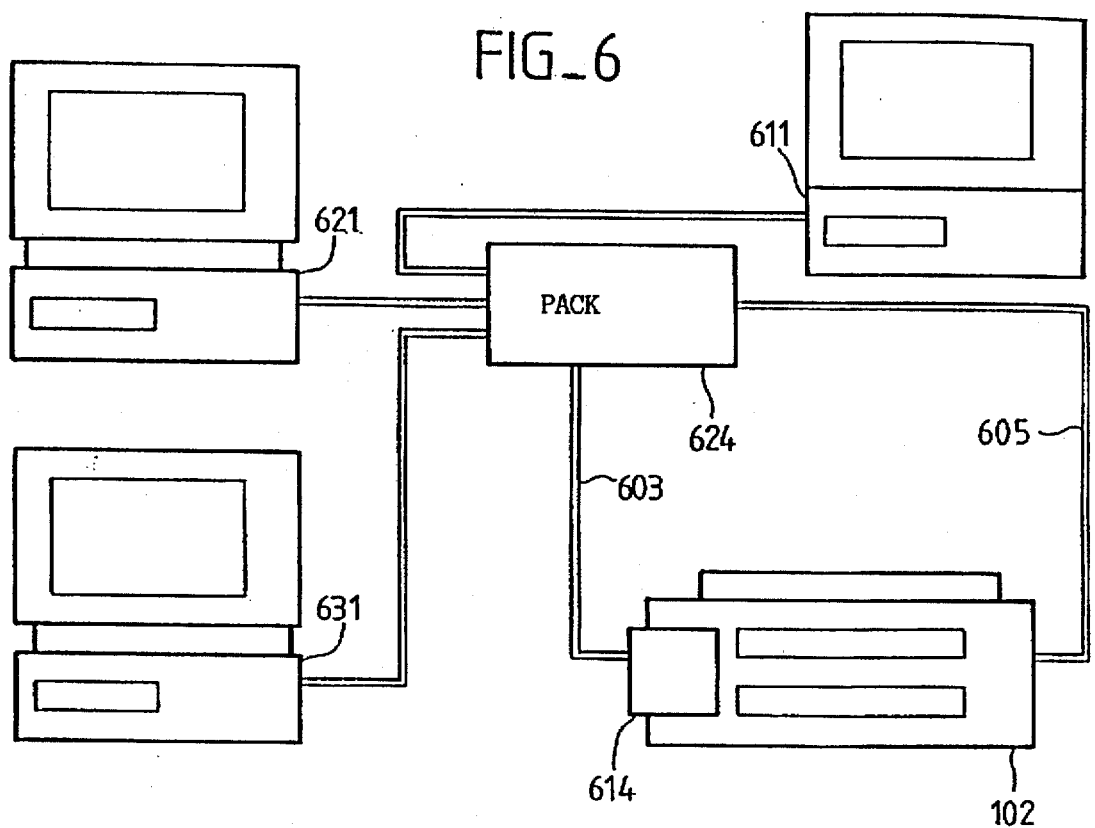
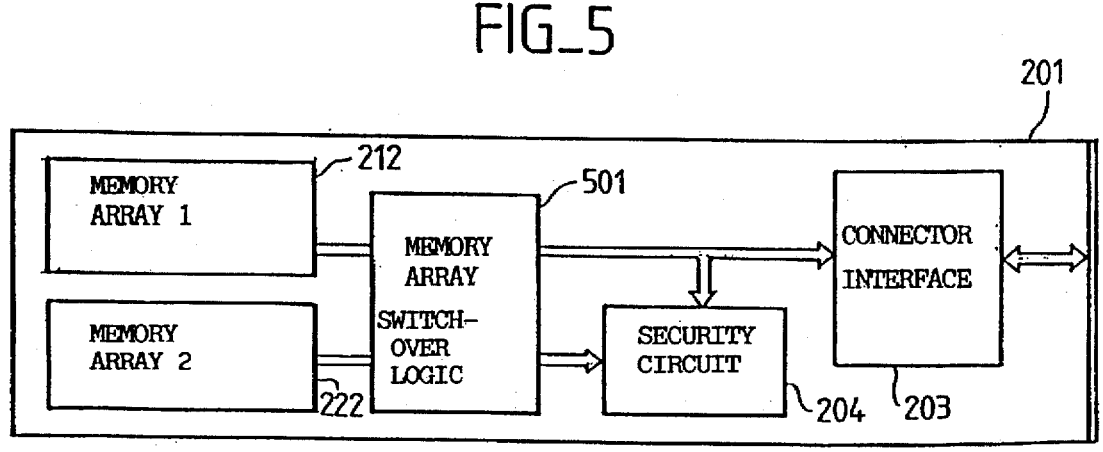

METHOD FOR CONTROLLING A PRINTER IN ORDER TO OBTAIN POSTAGES

BACKGROUND OF THE INVENTION

1. Field of the Invention

The present invention pertains to methods that can be used to control a printer, more particularly an ordinary printer of a microcomputer in order to make it print postal franking marks under conditions of security such that the possibilities of fraud are not greater than those with currently used machines, so as to obtain the approval of the Post Office for devices implementing this method.

2. Description of the Prior Art

When the volume of mail to be dispatched becomes ever so slightly great, the use of stamps becomes a painstaking process and entails substantial extra cost. This is why most companies and even individual professional workers generally use various types of franking machines to frank their mail. These machines are purchased or hired either from the Post Office or from specialized firms, and they have a lead-sealed counter that records the sum of the postal fees printed by the machine. This counter is regularly checked by the Post Office in order to prevent fraud. This check is done either by a visit to the premises by an official or by the conveying of the machine to the Post Office. In the latter case, it is generally preferred to use a machine with a counting module that is detachable, unlike in the case of so-called single-piece machines, in order to facilitate transport. While certain modern machines have a relatively developed electronic part that can be used to manage the printing mechanism and the mechanism for selecting the fees to be printed, the counter which is the sensitive part of the instrument as regards fraud is itself always mechanical. This approach entails the well-known drawbacks of mechanical systems, especially as regards wear and tear and lack of sophistication of the functions performed.

Franking machines furthermore have many other drawbacks. First of all, they are dedicated and can be used only for this job. Consequently, they have a high inherent cost to which it is necessary to add the environment, for example in terms of work-stations, that they need. Besides, they require specific handling operations which are themselves costly in terms of time and staff.

Besides, increasingly frequent use is being made of microcomputers, for example of the PC type, that enable the printing not only of text but increasingly of graphics and even of images, and which are happening to constitute the central work unit in present-day offices. These printers are now becoming highly sophisticated and, in laser technology models, their printing capacity is in practice limited only by the level of development of the control software. In practice, the connection with the computer is most often obtained by a parallel interface called a Centronics interface and the logic signals applied to this interface are the object of a very small number of standards, for example the Epson control set of standards or the Post-script language. The relationship between these signals and the head for printing on paper, this head limiting its action in fact to distributing dots on the surface of the paper in an extremely close matrix arrangement, is got by an electronic system that has the task of translating the commands applied to the interface into permission for printing each of these dots. The direct control of each dot is difficult to implement, especially for reasons of speed. Hence, at least for standard printing characters, logic circuits are used, arranged in such a way that a simple command corresponds to a character of a predetermined shape. All these characters correspond to what is called a font. These fonts comprise, for example, characters of the alphabet with various shapes such as bold, italics, roman, etc. The number of fonts directly included in the electronic circuitry of the printer is increasing regularly but, in view of costs, manufacturers generally prefer to use additional cartridges that are sold separately and get plugged into an ad-hoc connector of the printer. Reference could be made to the prior art constituted by the document D2: EP-A-0 181 949 for more details on the additional cartridges. The contents of these memories are of course not limited to the alphabet and to the commonly used signs such as those contained in the set of ASCII characters, but may be as varied as desired since they are defined by the designer of the software integrated into the cartridge. The limit actually corresponds only to the limit of resolution of the printer. To use the contents of the cartridge, the set of control instructions of the printer is used, enabling the transfer of the contents of the cartridge, or of a part of these contents if the cartridge has several fonts, into the memory of the printer. The set of commands of this printer is then used to select the font transferred into this memory.

At the earliest stages of the use of this technique, each manufacturer had a particular cartridge format as regards dimensions and connector as well as control logic, and it was even the case that certain manufacturers had several cartridge formats. A certain degree of standardization gradually became prevalent and, at the present time, the most commonly used format, constituting a de facto standard, is the PCMCIA format. In this format, the cartridge has the size of a credit card but is thicker and, on one of its small sides, has a connector comprising a large number of contacts. These cartridges are, in fact, originally designed to be used as elements replacing diskettes or hard disks in small-sized portable computers and they may contain a very large quantity of integrated memories. The use of these cartridges has then been extended by the addition of integrated circuits other than memories in order to enable their use for various functions, for example to serve as modems. For this purpose, it has then become necessary to add one or more other connectors to them, generally located on the other small side of the cartridge and forming, for example, a series link. Their extension to being used as cartridges for office printer fonts is immediate.

There is no difficulty per se in programming a computer so that the printer connected to it prints a postal franking mark. It is enough, for example, to reproduce this mark by means of a drawing software and to plan for instructions in order to obtain the modification, upon a request via the keyboard, of the variable characters such as the franking date and price. For this purpose it is possible, for example, to provide for blank zones inside the drawing and to fill them by means of a very simple word processor associated with a printing font correspond to the normal characteristics used by the postal authority. All these parameters are then sent to the printer to make it process the printing operation, for example, in the so-called "bit-map" form. Since this program could be used without any checking, its drafting and to an even greater extent its use would naturally have an essentially fraudulent character. It would nevertheless be extremely valuable to be able to use an office machine to print postal franking marks in a statutory manner. This would make it possible, for example, to generate this postal franking mark and the address simultaneously. The letter would then go from the drafting department to be handed over directly to the post office, and action by the mailing department of the firm would be extremely limited.

From the document D1: FR-A-2 580 844, considered as being the closest document in the prior art, there is a known method for the control of a computer printer to obtain postal franking marks comprising a detachable accounting set. This detachable set communicates with the computer, to which a printer of any type is connected.

In addition to the computer and the printer, this system brings into play a third element which is the accounting set.

Consequently, this system is bulky. Furthermore, it necessitates a remote loading of the franking marks during which there is a transfer from the accounting set to the computer and from the computer to the printer.

OBJECTS AND SUMMARY OF THE INVENTION

The present invention proposes a method that does not have these drawbacks. The control method according to the invention is consequently speedier while at the same time providing the requisite security.

To obtain this result, the invention proposes a method to control a printer to obtain postal franking; this printer being of the type comprising a detachable cartridge in which there is stored at least one font of characters designed to be loaded into the printer proper; this method being chiefly characterized in that at least one postal franking mark is stored in the cartridge, in that there is associated, with this franking mark, a security mark determined automatically by a secured method enabling the franking mark to be authenticated, these marks having the form of graphic elements translated into the format of the characters of the printer, and in that the loading of these marks into the printer is activated, and then their printing is activated.

BRIEF DESCRIPTION OF THE DRAWINGS

Other features and advantages of the invention shall appear more clearly from the following description, given by way of a non-restrictive example with reference to the appended figures, of which:

FIG. 1 shows a block diagram of a franking system according to an exemplary embodiment of the invention;

FIG. 2 exemplifies the contents of the cartridge 104 of the FIG. 1;

FIGS. 3 and 6 show alternative embodiments of the system of FIG. 1; and

FIGS. 4 and 5 show alternative embodiments of the cartridge 104.

DESCRIPTION OF THE PREFERRED EMBODIMENTS

FIG. 1 shows a system for the implementation of the invention, wherein a computer 101 is connected to a printer 102 by means of a series or parallel link 103. This printer is provided with a cartridge 104 that takes the place of a normal font cartridge but enables the printing, upon a command from the computer, of legitimate franking marks. This cartridge is preferably of the PCMCIA type meeting the ISO 7816 standard.

The cartridge 104, in its memory, has the statutory franking marks which are memorized in the format expected by the printer, namely for example a pixel matrix format called a "rasterized" format or a Bezier curve format called a "vectorized" format. As we have seen further above, this does not entail any difficulty per se. To obtain, on the contrary, the necessary security and prevent the fraudulently reconstituted or misused image of these marks from being borrowed in another freely accessible cartridge, the cartridge comprises a security system that associates an additional original security mark with each franking mark, when this franking mark is called up by the printer to be printed, the additional original security mark being associated with this franking mark and with this franking mark alone. This security mark could then be recognized by the Post Office provided with appropriate reading systems and it will authenticate the franking mark. This security mark may be formed by any desired type of graphics. The preferred exemplary embodiment of the invention proposes the use, as the simplest variant, of a bar code representing a series of numbers and/or characters whose decoding will authenticate the franking mark. The association between the franking mark and the security mark will be done according to a cryptographic system whose key will be known only to the Post Office and could be, for example, the key described in the patent application filed by the present Applicant under Ser. No. 91/11275 published on 19 Mar. 1993 under U.S. Pat. No. 2,681,490.

In view of the very small size of the cartridge and of its use in a standard printer, it is quite desirable to secure its utilization in order to reserve its use for the legitimate holder. For this purpose, one embodiment given by way of an illustration proposes the use of a system of security access such as the one described in the patent application filed by the present Applicant under Ser. No. 92/00321. Thus, when the cartridge is inserted into the printer, it will be able to deliver the franking marks and the corresponding security marks only after the entering of a secret code number known only to the legitimate user.

The cartridge will therefore use circuits of an already known type enabling the implementation of these security systems. It will furthermore comprise the devices, which are themselves known, that enable it to be shielded from physical tampering wherein, for example, it would be opened with a view to the reconstituting of the contents of the memories and the specialized protection integrated circuits.

The security mark will therefore comprise, in an encrypted form, all the particulars needed for identifying the cartridge and hence its possessor, i.e. essentially an identification number. It could furthermore comprise particulars pertaining to date and time enabling the subsequently used checking devices to compare the date and the time that may be printed on the franking mark so as to detect any attempts at fraud in a relatively simple way. These particulars could be obtained in the cartridge in this case by means of a clock saved by a long-life battery, according to a known method. This clock could then be used to restrict the duration of use of the cartridge, for example in the case of a fixed-price and fixed-period franking contract or, to oblige the user of the cartridge to have it checked at regular intervals. The latter point will be especially useful for the more frequent case where the cartridge has a counter that increments the fee units as and when it is used, as this counter will have to be read by the Post Office so that the user can be invoiced.

In an ordinary printer, when a font of characters is loaded into the central memory of the printer from the cartridge, the printer makes routine use of the font thus stored until it receives an instruction ordering it to reload another font. Naturally, in the case of the use of the printer to frank an envelope and if this payment of the franking is done per unit, it is necessary to reload the font at each printing of the franking mark and of its associated security mark since the latter has to be unique. It is then upon reception of this reloading command that the counter contained in the cartridge, when the payment is done per unit, will get incremented. For this purpose, the most practical method is to make provision, in the franking printer software contained in the computer connected to the printer, for an instruction that enforces this reloading of a cartridge. This software, which is itself very simple, will preferably be supplied by the postal authority along with the cartridge. Since most users are trustworthy and are not very well informed about computers, the possibilities of fraud wherein action will be taken in this program to remove this instruction will be very limited. The deterrence of fraudulent individuals if any will take place at the central postal authority level during the checking of the security marks, when two or more security marks are detected whereas there should be only one of them.

FIG. 2 shows a block diagram of an exemplary embodiment of the electronic circuits forming a cartridge such as this.

In a package 104, terminated on one side by a connector 201, there is assembled a set of memory circuits 202 storing the fonts and fixed data elements such as the identification numbers, and capable of storing variable data elements such as the number of fee units consumed since the cartridge was put into operation. These memories are connected to the connector 201 by an interface circuit 203 that, in particular, enables the decoding of the commands and addresses coming from the printer through the connector 201, according to a hardware and software interface that will depend on the printer and will preferably follow the PCMCIA standard. The link between this interface circuit and the memories will be parallel-connected to a security circuit 204 of a known type as referred to here above, which is furthermore connected to the memories 202. This circuit will carry out a detection, on the link between the interface circuit and the memories, of the signals ordering the reading of a franking font and, in this case, will implement the security procedure. If this security procedure is followed, it will compute the variable elements of the security mark and send them to the memories so that they are then read after the font corresponding to the franking mark. If the security procedure is not followed, it will block the reading of the memories both directly and by means of the interface circuit.

As a variant, one embodiment given by way of an example also proposes a hardware approach to prevent these problems as shown in FIG. 3.

As can be seen in this figure, the computer 101 is connected to the printer 102 not directly but by means of the franking cartridge 304. For this purpose, this cartridge has connectors designed to be connected to external links. One of these connectors is designed to receive a link 303 coming from the computer 101, of the series or parallel type as the case may be. The other connector is designed to receive a link 305 which is itself connected to the normal input of the printer 102. This link 305, here too, is a series or parallel link depending on the normal input connector of the printer. The cartridge 304 then has circuits enabling the detection of each request for the printing of a franking mark and then the transmission, on the link 305, of a command for reloading a font of characters to the printer 102. The printer control signals will, besides, be retransmitted from the link 303 to the link 305 so that the printer works normally. The only difference as compared with a direct link as in FIG. 1 therefore consists, for the additional circuits of the cartridge 304, in interrupting the link coming from the computer by sending it a "printer not ready" signal for the time during which the font is getting recharged. This is done very speedily by the connector which provides a direct link between the cartridge and the printer. During this stopping time, the cartridge first of all sends a font reloading signal to the printer through the link 305. This gives rise to an incrementing of the counter of the cartridge. When the font is reloaded, the cartridge again sends the computer a "printer ready" signal and lets through the control signals from the link 303 to the link 305. Thus, for the computer, the link through the cartridge 304 is quite transparent, from both the logic and the electrical points of view. Consequently, when the computer has to order the printer to print normal text, the action of the cartridge 304 is totally undetected since it comes into play only in detecting a command for the printing of a franking mark. It is even quite possible to make provision, in the cartridge 304, for unprotected ordinary fonts that may be loaded directly as chosen by the user without the action of devices for protecting the franking fonts.

Although the different varieties of cartridges or printers are tending to get unified and, more especially, are tending to evolve towards the PCMCIA standard, there still exists a large number of them. To then avert the need for the postal department to procure and handle large numbers of cartridges of different formats, one embodiment given by way of an illustration proposes, by way of a variant, to separate at least a part of the security elements in order to introduce them into a standardized packet for use by all. This packet could be, for example, of the PCMCIA type or even more simply it could have the bank credit card format defined by the ISO 7816 standard or possibly meeting the so-called ETSI GSM plug-in standard.

FIG. 4 shows a block diagram of an exemplary embodiment of this variant comprising a cartridge 114 designed to be connected to the printer by a connector 401 and a standard ancillary card called a chip card 124 designed to be connected to the cartridge 114 by means of a connector 421 that gets connected to an external connector 411 of the cartridge (in fact the form of these connectors which is well known is quite different from that of the figure).

In this variant, the security circuit 404 contained in the cartridge is a public type of circuit No. 1, namely a circuit comprising keys that are accessible to everybody. It is connected to a security circuit No. 2, referenced 414, contained in the chip card 124 which, for its part, is a circuit reserved for the authority distributing the card. This circuit is secured by the usual systems so that it cannot be tampered with. This separation into two separate circuits, one having the public key and the other the secret key, is well known in the prior art.

The chip card further comprises a memory 405 comprising in particular the credits allocated by the authority as well as, possibly, a number of other specific data elements such as, for example, the duration of use.

Consequently, only the detachable part corresponding to the chip card 124 has to be managed by the postal authority, which greatly facilitates its job. The individual user of the system for his part has to procure the cartridge 114 directly, for example from the manufacturer of the printer.

As we have seen further above, the loading of the fonts between the cartridge and the memory of the printer is very speedy, as compared with the method, used sometimes, of the remote loading of fonts from the computer. By contrast, the computing of the security mark by the specialized security circuit may require a certain amount of time, given firstly the length of the computations needed to use a truly secured algorithm and, secondly, the time needed for the formation, from the codes thus obtained, of the pattern forming the security mark proper.

However, as and when the numbers representing the pattern of the security mark emerge from the specialized security circuit, these numbers are stored and, with the franking mark, they form the full pattern which will subsequently be transmitted to the printer. Thus, there is nothing to prevent the advance preparation of the next security mark and its storage in a second memory where it will be ready to be called up if need be, possibly as soon as the previous mark has been printed. For this purpose, in one variant of an embodiment of the invention shown in FIG. 5, the memory of the cartridge is subdivided into two distinct arrays 212 and 222 that are accessible separately. The points of access to these arrays are managed by a memory array switch-over logic 501 that switches over after each printing of a franking mark and its associated security mark. This logic enables direct access by one of the arrays to the printer to print the franking mark with its security mark, and access by the other array to the security circuit to load the next security mark. At the end of the loading of the font contained in the memory called for a franking operation, the logic switches over and reverses the types of access to the two memory arrays.

This variant is especially useful when, as is often the case for reasons of cost, one and the same printer is being shared among several computers. It is possible to envisage the use, as is common, of an automatic change-over switch whose output is connected either to the printer or to the cartridge according to one of the two variants corresponding to FIGS. 1 and 3. However, by way of a variant and in order to enable discriminating among the rights of access of the different computers connected to the printer, one embodiment of the invention proposes the use of a structure similar to that shown in FIG. 6.

In this structure, the franking system is divided into two parts, a cartridge 614 proper introduced into the ad-hoc location of the printer 102 and a franking pack 624 that is external to the printer and to the computers 611, 621 and 631 that share this printer. The electronic circuits of the franking system will be distributed between the cartridge 614 and the pack 624 which has a sufficient number of connectors to be connected to the different computers. This variant uses the structure corresponding to the variant of FIG. 3 where the commands for the printer go through the franking system. The pack 624 therefore has a link 603 with the cartridge 614 and a direct link 605 with the main input connector of the printer 102. The distribution of the electronic circuits between the pack and the cartridge could be variable but, preferably, the main security circuits and circuits for the storage of variable data elements such as the utilisation credits will be left in the cartridge according to the variant of FIG. 4. In this way, the relations with the postal authority could be limited to the transportation of the cartridge 614 which, principle, will be more compact than the pack 624.

The loading of entitlement credits into the cartridge could be done according to a system of pre-payment as well as according to a system of post-payment.

In a system of pre-payment, a franking entitlement, represented for example in the form of a monetary value, is loaded into the cartridge and, as and when the cartridge is used, the security circuit decrements the value of this entitlement credit. When this value reaches zero, the cartridge refuses to print. It is quite possible to provide for the possibility of consulting this value through the computer in order to make provision, sufficiently in advance, for the reloading of the entitlement credits. This loading could be done, for example, as a complement to the entitlement credits remaining in the cartridge so that there is no interruption in the middle of the job.

In a system of post-payment, on the contrary, a counter is incremented as and when there are successive users of the cartridge and this counter is brought back to the issuing authority which reads the value therein and then issues an invoice. To prevent abuses, it is possible to make provision, in the post-payment system, for a ceiling beyond which the system shuts down, or for a limit date of use.

In practice, the pre-payment and the post-payment systems correspond above all to different business operations on the part of the postal authority which may very well, in the case of post-payment, require a deposit which will in fact fulfil the same role as prior payment in the pre-payment system.

The consultation by the authority of the counting memories of the cartridge as well as the loading of the different entitlement credits will be done according to different modalities of secured transaction which are well known, especially in the context of memory cards.

I claim:

1. A method of obtaining postal franking through franking marks, the method comprising the steps of:

providing a detachable cartridge for a printer;

storing at least one font of characters in the detachable cartridge, including the step of storing a postal franking mark in the detachable cartridge, the franking mark having the form of graphic elements translated into the format of the characters of the printer, determining a security mark automatically and in a secured manner, the security mark enabling the franking mark to be authenticated, the security mark having the form of graphic elements translated into the format of the characters of the printer, loading the security and franking marks into the printer, and then printing the security and franking marks.

2. A method according to claim 1, wherein the security mark comprises a cryptographic combination of the franking mark and at least one unique series number associated with the cartridge.

3. A method according to claim 2, wherein the security mark further comprises the contents of a secured counter incremented at each loading of the franking and security marks into the printer.

4. A method according to claim 2, wherein the security mark further comprises the date and time of loading of the franking and security marks into the printer.

5. A method according to claim 1, wherein the security mark is a directly readable bar code whose alphanumeric contents represent security information in an encrypted form.

6. A method according to claim 1, further comprising the steps of re-determining the security mark; and then reloading the franking and security marks into the printer; and reprinting the security and franking marks a plurality of times;

wherein the re-determining and reloading steps are performed before each performance of the reprinting step.

7. A method according to claim 6, wherein printer control signals are made to transit via the detachable cartridge to enable the detachable cartridge to intercept the control signals for the printing of a franking mark and to cause the control signals to be preceded by a control signal for the reloading of the font into the printer.

8. A method according to claim 7, wherein the transit of the control signals is electrically and logically transparent to a device which transmits the control signals.

9. A detachable cartridge for a primer, the detachable cartridge comprising
- a memory which stores a franking mark and a security mark, the security mark enabling the franking mark to be authenticated, the memory also storing fixed and variable data elements used for determining the security mark, and the franking mark and the security mark being in the form of graphic elements translated into the format of the characters of the printer,
- a security circuit which secures the access to the memory and which determines the security mark, the security mark being determined automatically and in a secure manner based on the fixed and variable data elements,
- a connector which is adapted for connecting the detachable cartridge to the printer, and
- an interface which connects the connector to the memory and to the security circuit.

10. A cartridge according to claim 9, further comprising
- a first additional connector, the first additional connected being adapted for connecting the cartridge to a device which controls the printing of the franking and security marks, and
- a second additional connector, the second additional connector being adapted for connecting the cartridge to a control signal input of the printer.

11. A cartridge according to claim 9,
- wherein the cartridge is formed of first and second cartridge substructures, the first cartridge substructure being adapted for being connected directly to the printer, and the second cartridge substructure being adapted for being connected to the first cartridge substructure; and
- wherein the security circuit is formed of first and second security circuit substructures, the first security circuit substructure being contained in the first cartridge substructure and the second security circuit substructure being contained in the second cartridge substructure, and
- wherein the second security circuit substructure further comprises a memory which contains the variable elements determining different uses of the cartridge.

12. A cartridge according to claim 11,
- wherein the first security circuit substructure contains public key elements, and
- wherein the second security circuit substructure contains secret key elements.

13. A cartridge according to claim 9, wherein the memory is divided into two arrays combined by a switch-over logic circuit so as to enable computation, in advance, of a security mark corresponding to the next use of the cartridge.

14. A cartridge according to claim 13, wherein the cartridge is formed of first and second cartridge substructures, the first cartridge substructure being adapted for being inserted directly into the printer, and the second cartridge substructure forming an external pack which is connected to the first cartridge substructure by a linking cable, the external pack being adapted for being connected to a set of several control elements which control the printing of franking marks.

15. A detachable cartridge for a printer, the detachable cartridge being adapted for providing a franking mark for postal franking mark to the printer, the detachable cartridge comprising
- a memory, the memory having the franking mark stored therein, the franking mark being stored in the format of a character of the printer, and the memory having a font of characters stored therein;
- a security circuit, the security circuit being coupled to the memory and limiting access to the memory, and the security circuit being adapted for determining, in a secure manner, a security mark which is uniquely associated with the franking mark and which thereby enables the franking mark to be authenticated;
- a connector which is adapted for detachably coupling the detachable cartridge to the printer; and
- an interface which connects the connector to the memory and to the security circuit.

16. A detachable cartridge according to claim 15, wherein the security mark comprises a cryptographic combination of the franking mark and at least one unique series number associated with the cartridge.

17. A detachable cartridge according to claim 16, wherein the security mark further comprises the contents of a secured counter incremented at each loading of the franking and security marks into the printer.

18. A detachable cartridge according to claim 15, wherein the security mark is re-determined and the franking mark and the security mark are reloaded into the printer before each printing of an additional franking mark.

19. A detachable cartridge according to claim 15, wherein printer control signals are transmitted via the detachable cartridge, and wherein the detachable cartridge intercepts the control signals for the printing of a franking mark and requires the control signals to be preceded by a control signal for the reloading of the font into the printer.

* * * * *